United States Patent
Wei et al.

(10) Patent No.: US 7,738,058 B2
(45) Date of Patent: Jun. 15, 2010

(54) COLOR FILTER FILM SUBSTRATE AND APPLICATION THEREOF

(75) Inventors: Shui-Wen Wei, Tainan County (TW); Chao-Chun Chung, Tainan County (TW)

(73) Assignee: Chimei Innolux Corporation, Miaoli County (TW)

( * ) Notice: Subject to any disclaimer, the term of this patent is extended or adjusted under 35 U.S.C. 154(b) by 103 days.

(21) Appl. No.: 12/171,622

(22) Filed: Jul. 11, 2008

(65) Prior Publication Data
US 2009/0015766 A1    Jan. 15, 2009

(30) Foreign Application Priority Data
Jul. 13, 2007    (TW) .............................. 96125694 A

(51) Int. Cl.
*G02F 1/1335*    (2006.01)
(52) U.S. Cl. ...................................... 349/106; 349/104
(58) Field of Classification Search ................... 349/97, 349/104, 106, 110
See application file for complete search history.

(56) References Cited

U.S. PATENT DOCUMENTS

| 7,212,264 B2* | 5/2007 | Kim et al. ................ 349/110 |
| 7,330,229 B2* | 2/2008 | Kitayama et al. .......... 349/106 |
| 2007/0211194 A1* | 9/2007 | Cho .......................... 349/106 |
| 2007/0216832 A1* | 9/2007 | Takahashi et al. .......... 349/106 |
| 2008/0036949 A1* | 2/2008 | Kim et al. .................. 349/106 |

* cited by examiner

*Primary Examiner*—Frank G Font
*Assistant Examiner*—Mary A El Shammaa
(74) *Attorney, Agent, or Firm*—Thomas, Kayden, Horstemeyer & Risley

(57) ABSTRACT

A color filter substrate and applications thereof are disclosed. The color filter substrate comprises a transparent substrate, a light-shade layer, a color filter layer and an electrode layer. The light-shade layer and the color filter layer are disposed on the transparent substrate. The electrode layer is formed on the light-shade layer and the color filter layer, wherein the electrode layer comprises at least one first electrode region, at least one second electrode region, at least one slit and at least one connecting portion. The first electrode region and the second electrode region are separated by the slit. The connecting portion is connected between the first electrode region and the second electrode region. The color filter substrate is applicable to a liquid crystal display panel and a liquid crystal display (LCD) apparatus.

20 Claims, 6 Drawing Sheets

COLOR FILTER FILM SUBSTRATE AND APPLICATION THEREOF

FIELD OF THE INVENTION

This invention relates to a color filter substrate and the applications thereof, and more particularly, to a color filter substrate and the applications for enhancing the forming of the multi-domain electric field.

BACKGROUND OF THE INVENTION

Liquid crystal displays (LCD) have been widely applied in electrical products due to the rapid progress of optical and semiconductor technologies. With their advantages of high image quality, compact size, light weight, low driving voltage, low power consumption and various applications, LCDs have been introduced into portable computers, mobile phones, personal digital assistants and color televisions and are becoming the mainstream display apparatus.

The LCD needs a color filter (CF) disposed therein to be colorful. A liquid crystal panel of the LCD can change the voltage to control the orientation of liquid crystal molecules in a liquid crystal layer. The liquid crystal molecules in the liquid crystal layer can switch the light provided from a backlight module to pass through or not. The light from the backlight module passes through the color filter to form colorful light. Currently, the CF substrate in the LCD includes a black matrix on a transparent substrate, a color filter film with red, green and blue colors formed in the black matrix and an ITO electrode on the color filter film.

Since the LCD has a major disadvantage of its narrow viewing angle, several techniques for increasing the view angle have been developed. Among the techniques, the ITO electrode of the CF substrate is patterned to form a plurality of electrode regions, thereby forming the multi-domain electric field to control the orientation of liquid crystal molecules and to increase the view angle.

Refer to FIG. 1A and FIG. 1B. FIG. 1A is a partial top view showing a conventional ITO electrode on a substrate, and FIG. 1B is a cross-sectional view along the cross-sectional line A-A' shown in FIG. 1A. However, when the ITO electrode 910 is patterned to form on a substrate 930 with a certain stereo-structure 920, such as the color filter film, there may be an undercut structure formed at the edge of the stereo-structure 920, and thus the ITO electrode 910 cuts off at the edge of the stereo-structure 920. Therefore, a portion of the ITO electrode 910 may not be conductive, and the liquid crystal panel of the LCD cannot form the multi-domain electric field to control the orientation of liquid crystal molecules.

SUMMARY OF THE INVENTION

Therefore, an aspect of the present invention is to provide a color filter substrate and the applications thereof to form the multi-domain electric field in the liquid crystal layer and prevent an electrode layer thereon from cutting off, thereby enhancing the forming of the multi-domain electric field.

According to an embodiment of the present invention, the color filter substrate comprises a transparent substrate, a light-shade layer, a color filter layer and an electrode layer. The light-shade layer may be formed on the transparent substrate and has a black matrix structure. The color filter layer may be formed in the black matrix structure. The electrode layer may be formed on the light-shade layer and the color filter layer, wherein the electrode layer comprises at least one first electrode region, at least one second electrode region, at least one slit and at least one connecting portion. The first electrode region has at least a portion covering the edge of the color filter layer. The slit may be formed between the first electrode region and the second electrode region. The connecting portion may be formed in the slit to connect the first electrode region and the second electrode region.

According to another embodiment of the present invention, the liquid crystal display panel comprises a color filter substrate, an active component array substrate and a liquid crystal layer. The color filter substrate comprises a transparent substrate, a light-shade layer, a color filter layer and an electrode layer. The light-shade layer may be formed on the transparent substrate and has a black matrix structure. The color filter layer may be formed in the black matrix structure. The electrode layer may be formed on the light-shade layer and the color filter layer, wherein the electrode layer comprises at least one first electrode region, at least one second electrode region, at least one slit and at least one connecting portion. The first electrode region has at least a portion covering the edge of the color filter layer. The slit formed between the first electrode region and the second electrode region. The connecting portion may be formed in the slit to connect the first electrode region and the second electrode region. The active component array substrate is disposed opposite to the color filter substrate. The liquid crystal layer may be formed between the color filter substrate and the active component array substrate.

According to another embodiment of the present invention, the liquid crystal display panel is applicable to a liquid crystal display (LCD) apparatus.

Therefore, with the use of the color filter substrate and the applications thereof disclosed in the embodiments of the present invention, the electrode layer can be prevented from cutting off. In turn, this may enhance the forming of the multi-domain electric field in the liquid crystal layer and raise the yield of the manufacturing and product.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

In order to make the illustration of the present invention more explicit and complete, the following description is stated with reference to FIG. 2 through FIG. 6.

Figure 1A:
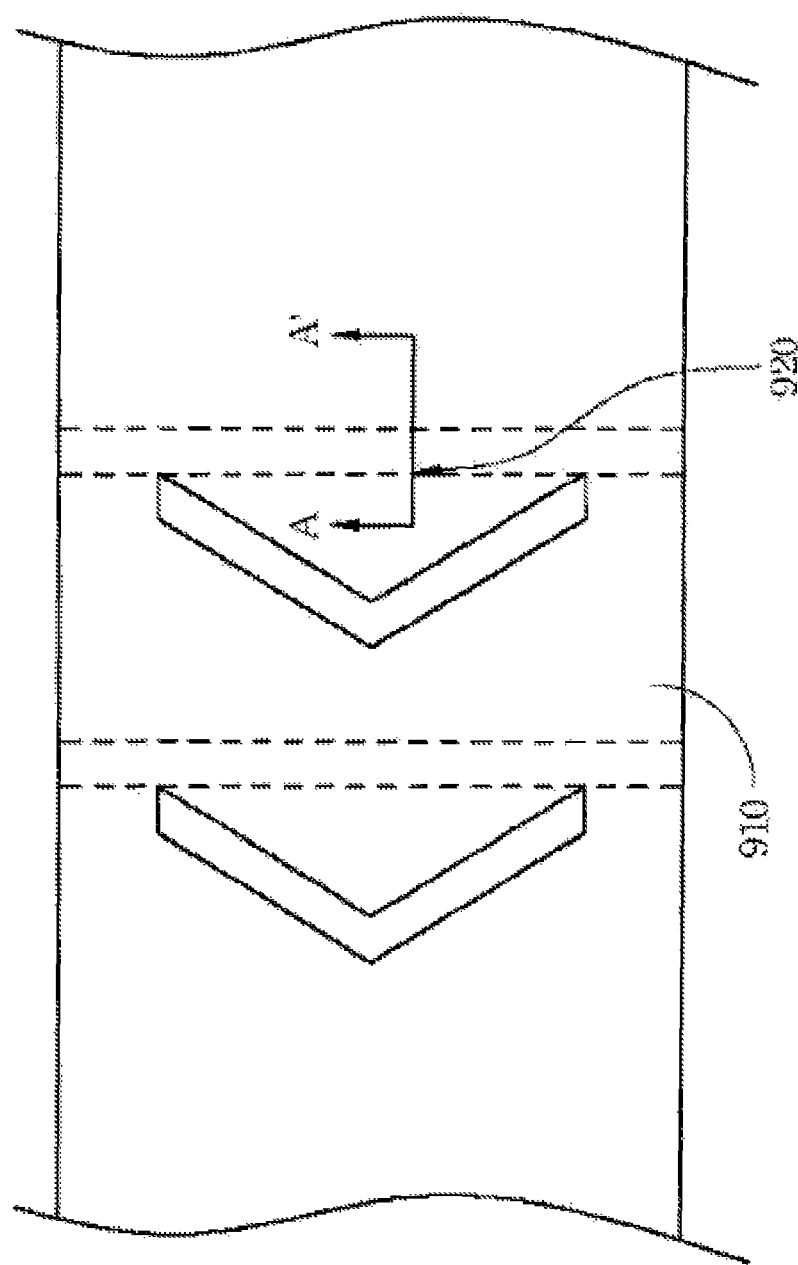
FIG. 1A is a partial top view showing a conventional ITO electrode on a substrate.
Figure 1B:
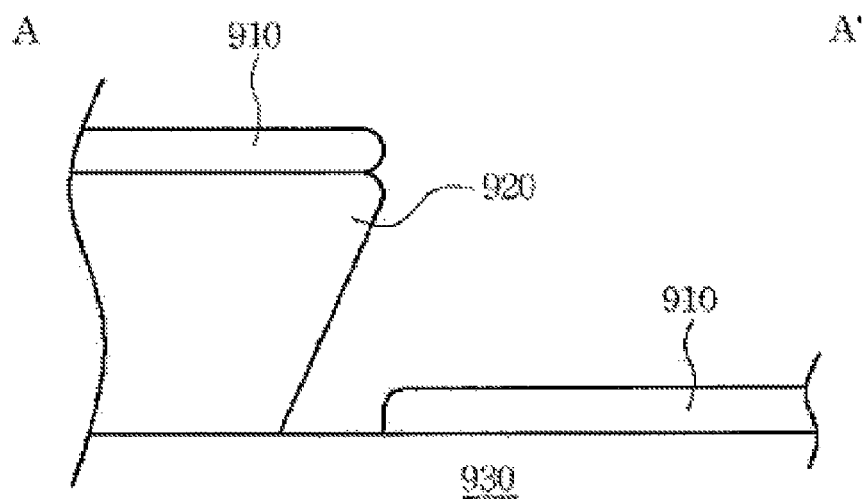
FIG. 1B is a cross-sectional view along the cross-sectional line A-A' shown in FIG. 1A.
Figure 2:
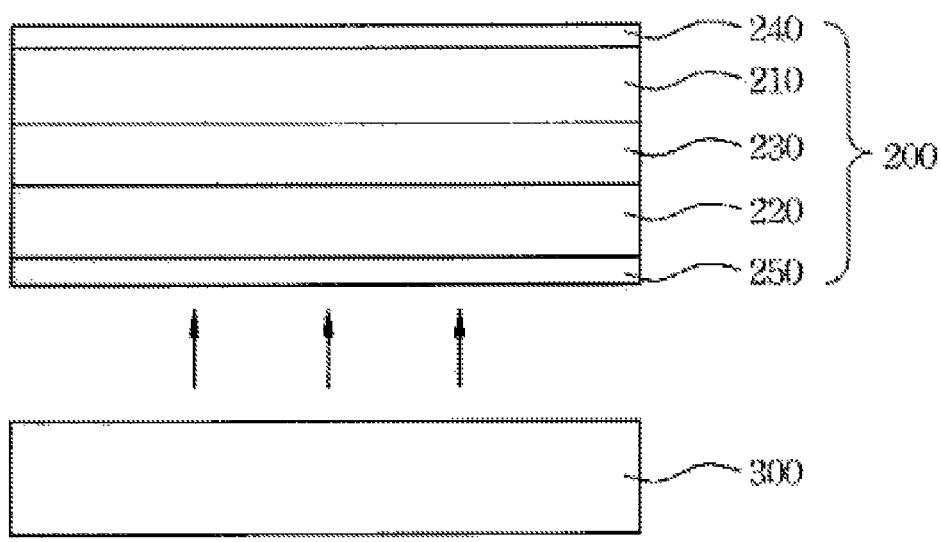
FIG. 2 is a cross-sectional view showing a liquid crystal display apparatus according to a first embodiment of the present invention.
Figure 3:
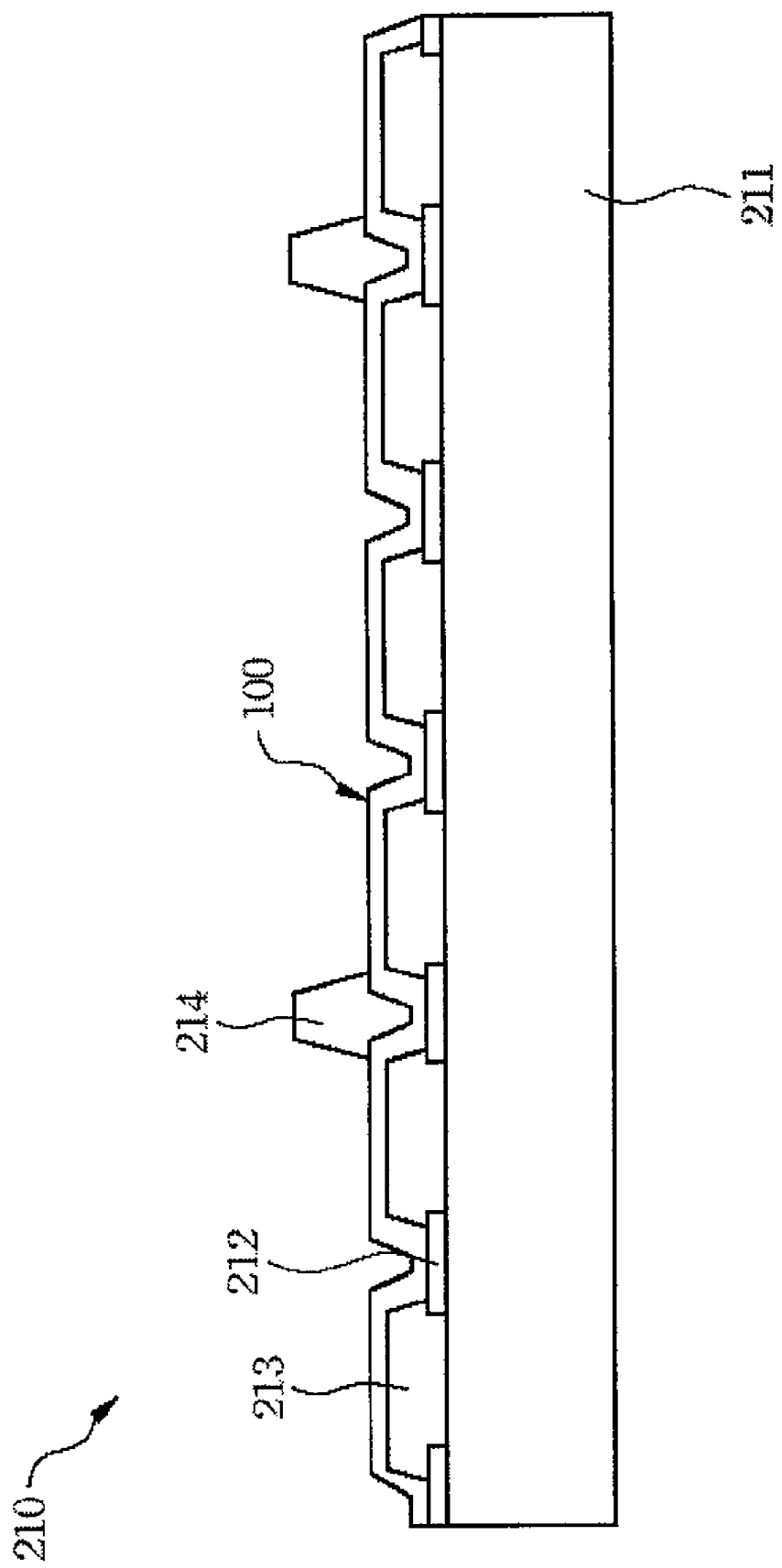
FIG. 3 is a cross-sectional view showing an electrode layer on a color filter substrate according to a first embodiment of the present invention.
Figure 4:
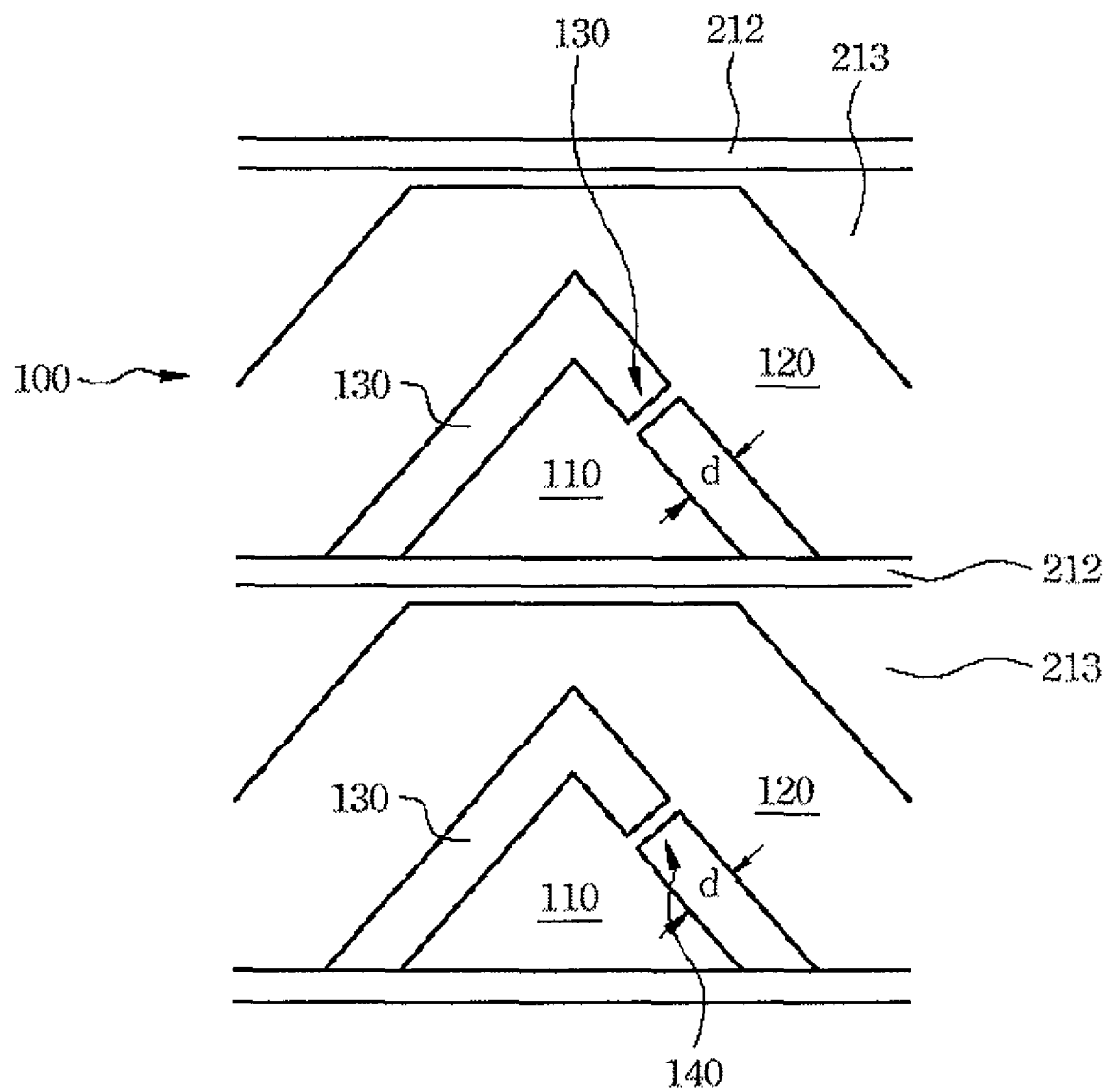
FIG. 4 is a top view showing an electrode layer according to a first embodiment of the present invention.

Refer to FIG. 2 through FIG. 4. FIG. 2 is a cross-sectional view showing a liquid crystal display apparatus according to a first embodiment of the present invention. FIG. 3 is a cross-sectional view showing an electrode layer on a color filter substrate according to a first embodiment of the present invention. FIG. 4 is a top view showing an electrode layer according to a first embodiment of the present invention. The electrode layer 100 may be formed on a color filter substrate 210 of a liquid crystal display panel 200 to form multi-domain electric field to control the orientation of liquid crystal molecules, thereby increasing the view angle of the liquid crystal display panel 200. The liquid crystal display panel 200 is disposed opposite to a backlight module 300, thereby forming a liquid crystal display (LCD) apparatus.

Referring again to FIG. 2, the liquid crystal display panel 200 of the present embodiment comprises a color filter substrate 210, an active component array substrate 220, a liquid crystal layer 230, a first polarizer 240 and a second polarizer 250. The color filter substrate 210 is disposed opposite to the active component array substrate 220. The liquid crystal layer 230 is formed between the color filter substrate 210 and the active component array substrate 220. The first polarizer 240 is disposed on one side of the color filter substrate 210 and opposite to the active component array substrate 220. The second polarizer 250 is disposed on one side of the active component array substrate 220 and opposite to the color filter substrate 210. When the backlight module 300 provides the liquid crystal display panel 200 with the backlight, the backlight passes through the liquid crystal display panel 200 from the second polarizer 250 to the first polarizer 240. The electrode layer 100 may be formed on the color filter substrate 210, and the active component array substrate 220 may be a thin film transistor (TFT) array substrate.

Referring again to FIG. 3, the color filter substrate 210 of the present embodiment comprises a transparent substrate 211, a light-shade layer 212, a color filter layer 213, a plurality of spacers 214 and the electrode layer 100. The transparent substrate 211 may be a glass substrate or a flexible transparent substrate. The light-shade layer 212 may be formed on the transparent substrate 211 and may have a black matrix structure to divide the color filter layer 213 into different color filters and raise the color contrast of the liquid crystal display panel 200. The light-shade layer 212 may be made of metal (such as chromium), graphite, resin, or other material. In various embodiments, the color filter layer 213 may include at least one red color filter, at least one green color filter and at least one blue color filter, thereby forming different colors.

The electrode layer 100 of the present embodiment may be formed on the light-shade layer 212 and the color filter layer 213 to be a common electrode. Thus, in turn cooperating with a pixel electrode of the active component array substrate 220 to form the electric field to control the orientation of liquid crystal molecules in the liquid crystal layer 230. The spacers 214 may be disposed on the electrode layer 100 to regulate the cell gap between the color filter substrate 210 and the active component array substrate 220. The spacers 214 may be made of silica, polymer or resistant material, and may be in the form of a spherical shape or a column shape. In various embodiments, the thickness of the light-shade layer 212 may be different than the thickness of the color filter layer 213, and there may be an undercut structure formed there between. Therefore, when the electrode layer 100 is formed on the light-shade layer 212 and the color filter layer 213, the electrode layer 100 may cut off and may not be continuous.

Next, referring again to FIG. 4, the electrode layer 100 of the present embodiment may be made of electrically conductive and transparent material, such as ITO, IZO, AZO, GZO, TCO or ZnO. The electrode layer 100 comprises at least one first electrode region 110, at least one second electrode region 120, at least one slit 130 and at least one connecting portion 140. The first electrode region 110 has at least a portion covering the edge of the color filter layer 213. The slit 130 is formed between the first electrode region 110 and the second electrode region 120 to pattern the electrode layer 100. In turn, this may form the multi-domain electric field to control the orientation of liquid crystal molecules. The connecting portion 140 may be formed in the slit to connect the first electrode region and the second electrode region, thereby preventing the first electrode region 110 or the second electrode region 120 from being not electrically conductive. In the present embodiment, the slit 130 may be in the form of a V-shape, thereby making the first electrode region 110 to be a triangular shape or a wedge-shape, and the shape of the second electrode region 120 corresponds to the first electrode region 110. The width of the slit 130 (i.e. the distance d between the first electrode region 110 and the second electrode region 120) may be approximately 9 μm. The slit 130 can regulate the electric field to form the multi-domain electric field in the liquid crystal layer 230, thereby increasing the view angle.

The connecting portion 140 is connected between the first electrode region 110 and the second electrode region 120, thereby allowing the first electrode region 110 to be electrically connected to the second electrode region 120. In various embodiments, the width of the connecting portion 140 may be approximately 3 μm. When the electrode layer 100 cuts off due to an unexpected situation, such as the undercut structure between the light-shade layer 212 and the color filter layer 213, the first electrode region 110 may still be electrically conductive by being connected to the connecting portion 140 and the second electrode region 120. Alternatively, the second electrode region 120 may be electrically conductive by being connected to the connecting portion 140 and the first electrode region 110. In an embodiment of the present disclosure, the width of the connecting portion 140 may be less than 6 μm, so that it is connected between the first electrode region 110 and the second electrode region 120 but does not affect the electric field in the liquid crystal layer 230.

The electrode layer 100 may use the connecting portion 140 to prevent the first electrode region 110 or the second electrode region 120 from not being electrically conductive and enhance the forming of the multi-domain electric field in the liquid crystal layer 230. In turn, this may raise the yield of manufacture and product.

Figure 5:
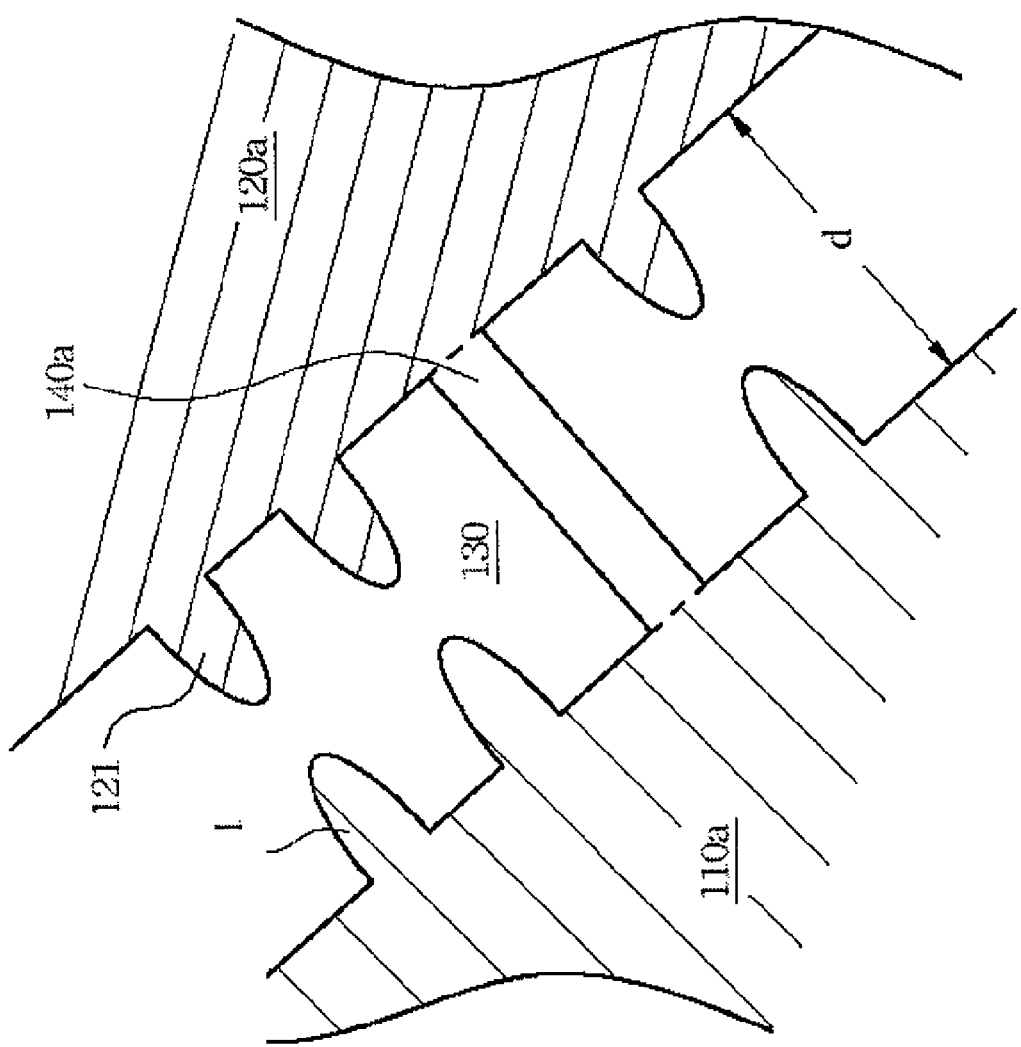
FIG. 5 is a partial top view showing an electrode layer according to a second embodiment of the present invention.

Next, with respect to FIG. 5, illustrated is a partial top view showing an electrode layer according to a second embodiment of the present invention. Some reference numerals shown in the first embodiment are used in the second embodiment of the present invention. The construction shown in the second embodiment is similar to that in the first embodiment with respect to configuration and function, and thus is not stated in detail herein.

Referring again to FIG. 5, in comparison with the first embodiment, the first electrode region 110 and the second electrode region 120 of the second embodiment may include a plurality of finger-like structures 111 and 121 formed in the slit 130. In one embodiment, the connecting portion 140a may be connected between the finger-like structures 111 and 121, thereby preventing the first electrode region 110 or the second electrode region 120 from being not electrically conductive.

Figure 6:
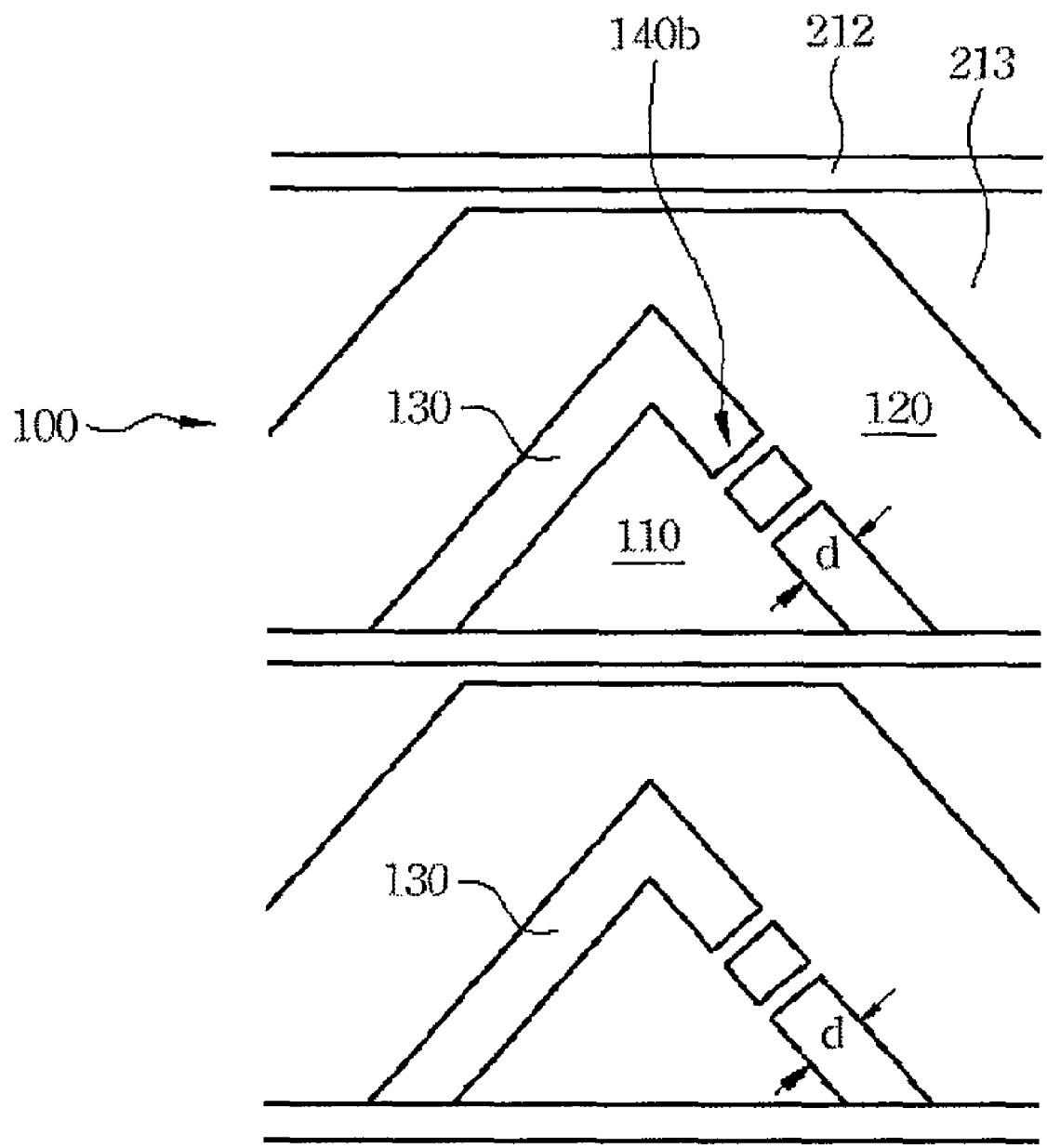
FIG. 6 is a partial top view showing an electrode layer according to a third embodiment of the present invention.

Next, FIG. 6 illustrates a partial top view showing an electrode layer according to a third embodiment of the present invention. Some reference numerals shown in the first embodiment are used in the third embodiment of the present invention. The construction shown in the third embodiment is similar to that in the first embodiment with respect to configuration and function, and thus is not stated in detail herein.

Referring again to FIG. 6, in comparison with the first embodiment, the electrode layer 100 of the third embodiment comprises a plurality of connecting portions 140b connected between the first electrode region 110 and the second electrode region 120. In the third embodiment, the electrode layer 100 may include two connecting portions 140b formed in the slit 130. The number of connecting portions 140b and the distance there between are limited such that they may not affect the forming of the multi-domain electric field. In various embodiments, the distance between each two of the connecting portions 140b may be greater than 10 µm.

The electrode layer of the present disclosure may prevent the first electrode region or the second electrode region from being not electrically conductive, thereby raising the yield of manufacture and product.

As is understood by a person skilled in the art, the foregoing description is of certain embodiments of the present invention, and as such should be properly construed as illustrative of, rather than limiting on the present invention. Various modifications and similar arrangements are included within the spirit and scope of the appended claims, the scope of which should be accorded the broadest interpretation so as to encompass all such modifications and similar structures.

What is claimed is:

1. A color filter for a liquid crystal display panel, comprising:
    a transparent substrate;
    a light-shade layer formed on the transparent substrate and having a black matrix structure;
    a color filter layer formed in the black matrix structure; and
    an electrode layer formed on the light-shade layer and the color filter layer, wherein the electrode layer comprises:
        at least one first electrode region having at least a portion covering an edge of the color filter layer;
        at least one second electrode region;
        at least one slit formed between the first electrode region and the second electrode region; and
        at least one connecting portion formed in the slit to connect the first electrode region and the second electrode region.

2. The color filter substrate of claim 1, wherein a width of the connecting portion is less than 6 µm.

3. The color filter substrate of claim 2, wherein a width of the connecting portion is approximately 3 µm.

4. The color filter substrate of claim 1, wherein the first electrode region and the second electrode region include a plurality of finger-like structures formed in the slit.

5. The color filter substrate of claim 4, wherein the connecting portion is connected between the finger-like structures of the first electrode region and the second electrode region.

6. The color filter substrate of claim 1, wherein the electrode layer comprises a plurality of connecting portions connected between the first electrode region and the second electrode region.

7. The color filter substrate of claim 1, wherein a distance between each two of the connecting portions is greater than 10 µm.

8. The color filter substrate as claimed in claim 1, wherein a width of the slit is approximately 9 µm.

9. The color filter substrate as claimed in claim 1, wherein the slit is in a form of a V-shape.

10. A liquid crystal display panel, comprising:
    a color filter substrate, comprising:
        a transparent substrate;
        a light-shade layer formed on the transparent substrate and having a black matrix structure;
        a color filter layer formed in the black matrix structure; and
        an electrode layer formed on the light-shade layer and the color filter layer, wherein the electrode layer comprises:
            at least one first electrode region having at least a portion covering an edge of the color filter layer;
            at least one second electrode region;
            at least one slit formed between the first electrode region and the second electrode region; and
            at least one connecting portion formed in the slit to connect the first electrode region and the second electrode region;
    an active component array substrate disposed opposite to the color filter substrate; and
    a liquid crystal layer formed between the color filter substrate and the active component array substrate.

11. The liquid crystal display panel of claim 10, wherein a width of the connecting portion is less than 6 µm.

12. The liquid crystal display panel of claim 10, wherein a width of the connecting portion is approximately 3 µm.

13. The liquid crystal display panel of claim 10, wherein the first electrode region and the second electrode region include a plurality of finger-like structures formed in the slit.

14. The liquid crystal display panel of claim 13, wherein the connecting portion is connected between the finger-like structures of the first electrode region and the second electrode region.

15. The liquid crystal display panel of claim 10, wherein the electrode layer comprises a plurality of connecting portions connected between the first electrode region and the second electrode region.

16. The liquid crystal display panel of claim 10, wherein a distance between each two of the connecting portions is greater than 10 µm.

17. The liquid crystal display panel of claim 10, wherein a width of the slit is approximately 9 µm.

18. The liquid crystal display panel of claim 10, wherein the slit is in a form of a V-shape.

19. The liquid crystal display panel of claim 10, wherein the active component array substrate is a thin film transistor (TFT) array substrate.

20. A liquid crystal display apparatus, comprising:
    a backlight module; and
    a liquid crystal display panel disposed opposite to the backlight module, wherein the liquid crystal display panel comprises:
        a color filter substrate, comprising:
            a transparent substrate;
            a light-shade layer formed on the transparent substrate and having a black matrix structure;
            a color filter layer formed in the black matrix structure; and
            an electrode layer formed on the light-shade layer and the color filter layer, wherein the electrode layer comprises:
                at least one first electrode region having at least a portion covering an edge of the color filter layer;
                at least one second electrode region;
                at least one slit formed between the first electrode region and the second electrode region; and
                at least one connecting portion formed in the slit to connect the first electrode region and the second electrode region;
        an active component array substrate disposed opposite to the color filter substrate; and
        a liquid crystal layer formed between the color filter substrate and the active component array substrate.

* * * * *